United States Patent [19]
Smith

[11] Patent Number: 5,822,400
[45] Date of Patent: Oct. 13, 1998

[54] CALL RECORD SCHEDULING SYSTEM AND METHOD

[75] Inventor: B. Scott Smith, Londonderry, N.H.

[73] Assignee: Davox Corporation, Westford, Mass.

[21] Appl. No.: 699,292

[22] Filed: Aug. 19, 1996

[51] Int. Cl.$^6$ .............................. H04M 1/24; H04M 3/00; H04M 5/00

[52] U.S. Cl. ........................... 379/34; 379/265; 379/266; 379/309

[58] Field of Search .............................. 379/67, 265, 266, 379/113, 114, 128, 133, 34, 309

[56] References Cited

U.S. PATENT DOCUMENTS

| | | | |
|---|---|---|---|
| 4,933,964 | 6/1990 | Girgis | 379/67 |
| 5,179,589 | 1/1993 | Syu | 379/265 |
| 5,185,780 | 2/1993 | Leggett | 379/34 |
| 5,185,782 | 2/1993 | Srinivasian | 379/214 |
| 5,214,688 | 5/1993 | Szlam et al. | 379/67 |
| 5,247,569 | 9/1993 | Cave | 379/113 |
| 5,291,550 | 3/1994 | Levy et al. | 379/242 |
| 5,297,195 | 3/1994 | Thorne et al. | 379/93 |
| 5,327,491 | 7/1994 | Dzu-Syu | 379/265 |
| 5,341,412 | 8/1994 | Ramot et al. | 379/92 |
| 5,436,965 | 7/1995 | Grossman et al. | 379/266 |
| 5,495,523 | 2/1996 | Stent et al. | 379/265 |
| 5,499,291 | 3/1996 | Kepley | 379/265 |
| 5,517,566 | 5/1996 | Smith et al. | 379/265 |
| 5,530,744 | 6/1996 | Charalambous et al. | 379/265 |
| 5,533,103 | 7/1996 | Peavey et al. | 379/69 |
| 5,561,711 | 10/1996 | Muller | 379/266 |
| 5,592,543 | 1/1997 | Smith et al. | 379/265 |
| 5,594,791 | 1/1997 | Szlam et al. | 379/265 |
| 5,621,790 | 4/1997 | Grossman et al. | 379/266 |
| 5,640,445 | 6/1997 | David | 379/113 |

*Primary Examiner*—Curtis A. Kuntz
*Assistant Examiner*—Rexford N. Barnie
*Attorney, Agent, or Firm*—Daniel J. Bourque, Esq.; Kevin J. Carroll, Esq.

[57] ABSTRACT

A call record scheduling system for prioritizing call records for an outbound dialing system. Call records are downloaded to a call center record manager which preliminarily filters the records to select only certain records for a call campaign. Call records are then individually processed to produce a time range and priority for each call record to be dialed. This time range and priority are inserted into a priority table which may have more than one entry for each call record. A call record scheduler scans the priority table and selects call records to be downloaded to the outbound dialer to be presently dialed. The call record scheduler dynamically adjusts the priority table, including inserting and deleting priority table entries and changing the priority value. The present system allows control over when to place telephone calls during an ongoing telephone campaign, thereby increasing the likelihood of reaching the called party.

21 Claims, 4 Drawing Sheets

34

| | RECORD ID ACCOUNT NUMBER 44 | START 46 | STOP 48 | PRIORITY (STATIC & DYNAMIC) 50 |
|---|---|---|---|---|
| LINE 1 | 001 | | | 0 |
| LINE 2 | 003 | 8am | 10am | 8 |
| LINE 3 | 003 | 3pm | 6:15pm | 4 |
| LINE 4 | 007 | 6pm | 8pm | 5 |
| LINE 5 | 008 | 8am | 10am | 6 |
| LINE 6 | | | | |
| | | | | |
| LINE N | 999 | | | 0 |

43 spans START, STOP, PRIORITY columns.

FIG. 3

CALL RECORD SCHEDULING SYSTEM AND METHOD

FIELD OF THE INVENTION

This invention relates to a telephone call account management system and method and more particularly, to a system and method for prioritizing when to place calls to telephone accounts.

BACKGROUND OF THE INVENTION

Many businesses and customer service organizations utilize telephone systems including automated telephone dialing equipment to contact customer and client accounts. Such telephone systems often include the ability to process a large number of customer account records grouped together as a campaign. These customer account records can include customer credit card accounts, marketing accounts, or other information.

Telephone systems attempt to automate outbound dialing as much as possible. Such systems often include automatic dialers and groups of agents to talk to customers. Each agent usually has a telephone headset and computer terminal which displays information on the customer's account. A supervisor oversees the processing of a group of call account records being dialed, known as a call campaign, and can manage the system and campaign through a supervisory workstation. The call account records are usually stored on a host computer.

Existing telephone systems often process campaigns in a batch, wherein customer account records are downloaded as a campaign to an automated dialer which dials the telephone numbers, and upon detecting an answer, the call is connected to an agent to process the call. Automated dialers allow the telephone system to maintain a fairly constant level of connecting calls, thereby making efficient use of the agents.

Existing automated outbound dialers, however, simply dial call account records in the order the dialer receives them, which is generally the sequential order of the customer account records making up the campaign or the order in which the customer account records are stored. Calls that are not answered can be retried a predetermined number of times to attempt to reach the party, but the call back times are not scheduled in any sensible way. Further, if a call campaign starts up at 10:00 a.m. eastern standard time, calls will be made sequentially trying to reach the customer without any determination of whether the time called is a reasonable time to attempt to reach the called party. For example, if a person in California on pacific time is dialed at 10:00 a.m. eastern standard time, they will receive the call at 7:00 a.m. This is not a particularly courteous time to call, and may be illegal if the call is for bill collection purposes.

Prior art telephone systems have used very simple call screenings or filters to select whether to call certain account records. A common technique is to pass the call records through a simple filter which selects call records to presently dial based on one or more user specified criteria. One such criteria includes time zone divisions, based on the area code of the number being dialed, to avoid calling too early or too late for a receiving party. The filter will scan a list of call records which make up the campaign, and skip any records that do not meet the criteria.

Another simple technique used is to use a filter which will dial a work number during normal working hours of a day, and which will dial a home number in early evening, when it would be appropriate for the called party to be home.

Such rudimentary filters which control dialing calls at certain times are helpful as a general selection criteria, but are not helpful based upon the individual requirements of each account. The called party attempting to be reached may work outside normal working hours or simply have different telephone numbers to call at different times of the day. It is also common that a person may be more likely to be reached at a certain time of the day, such as lunch time, than another time.

Another problem with simple selection filtering is that once a call campaign starts, the call records are still dialed sequentially as presented in the list, with no deference as to timing priority. While a filter can select whether now is an appropriate time to make a call, the filter can only choose to skip dialing that call. It cannot prioritize one call over another based on a comparison of the appropriate or desired time(s) to place the calls.

For example, if a call campaign is filtered so that only call account records in pacific and mountain time zones are dialed, the records are selected and dialed in sequential order. If it was late in the evening, it would make sense to dial the mountain central time call accounts before dialing the calls for pacific time accounts since the latter are an hour earlier. Present telephone systems which simply dial numbers in the order they receive the numbers are unable to discern or make use of such an advantageous calling pattern. If campaigns were downloaded to sort the pacific time calls from the mountain time calls, the ability to overlap and group areas as one campaign would be lost.

A further problem is that once the system starts dialing numbers, it is not possible to dynamically update the system dialing order or sequence based on any real-time parameters. Existing telephone systems are capable of accepting inbound calls from customers and connecting the calls to agents while still running outbound call campaigns. An unexpected volume of inbound calls can tie up agent operators and slow down the processing of the outbound call campaigns. Prior art telephone systems cannot automatically adjust for such unforeseen problems.

For example, if a call campaign is proceeding slower than expected, it would be beneficial to be able to reschedule the call dialing order to ensure that important calls get placed before the campaign time slot expires. Present telephone call systems which simply dial telephone numbers in the order they receive them are unable to dynamically alter the call record dialing order.

Accordingly, what is needed is a telephony system including a call scheduling system that can prioritize calls so that the number of connecting calls over time remains fairly constant, providing enough calls to keep agents busy, but which also allows individual call records to be dialed at more appropriate times for the called party based upon experience, call history, or other similar criteria.

SUMMARY OF THE INVENTION

The present invention features an outbound call scheduling system which includes a source of call records to be potentially processed. A call center record manager is responsive to this source of call records and allows a user to input at least one user selectable call record selection criteria for sorting through the call records to be potentially processed, to prioritize particular call records to dial for a given call campaign. Each call record includes one or more time range value and priority value generated by the call center record manager. These time range and priority values are inserted into a call record priority table. The call center record manager can then scan the table and select call records based on time range and priority and download them to the telephone dialer.

Call records may contain a unique call record identifier to allow tracking of particular call records. Call records may also contain historical data on customer account activity to allow the system to be able to calculate priority and time ranges for dialing calls. Alternatively, historical data may be stored by the call center records manager separately from the call records. Such historical data can include previous attempts to contact the called party, or more specific information including successful contacts, times not to call, and information about what was decided during the last contact with the called party.

The user selectable call record selection criteria can include time zone information, the amount of time the collection is past due or the amount of money that is due, failure to reach the party after a number of attempts, etc.

The priority table may be updated dynamically. As the call campaign progresses and time passes, the priority value entries may be adjusted by the call center record manager. New call record entries may be added as well as call records deleted for calls that have been completed.

If a call is not completed, the call record may be placed in a recall queue, so the call will be made again during an appropriate time. A recall may change the priority of the call record, so for example, it may have a higher priority than call records that have not been dialed yet.

BRIEF DESCRIPTION OF THE DRAWINGS

These and other features and advantages of the present invention will be better understood by reading the following detailed description, taken together with the drawings wherein:

FIG. 3 is a schematic representation of a call record range value table utilized by the present invention.

DETAILED DESCRIPTION OF THE PREFERRED EMBODIMENT

Figure 1:
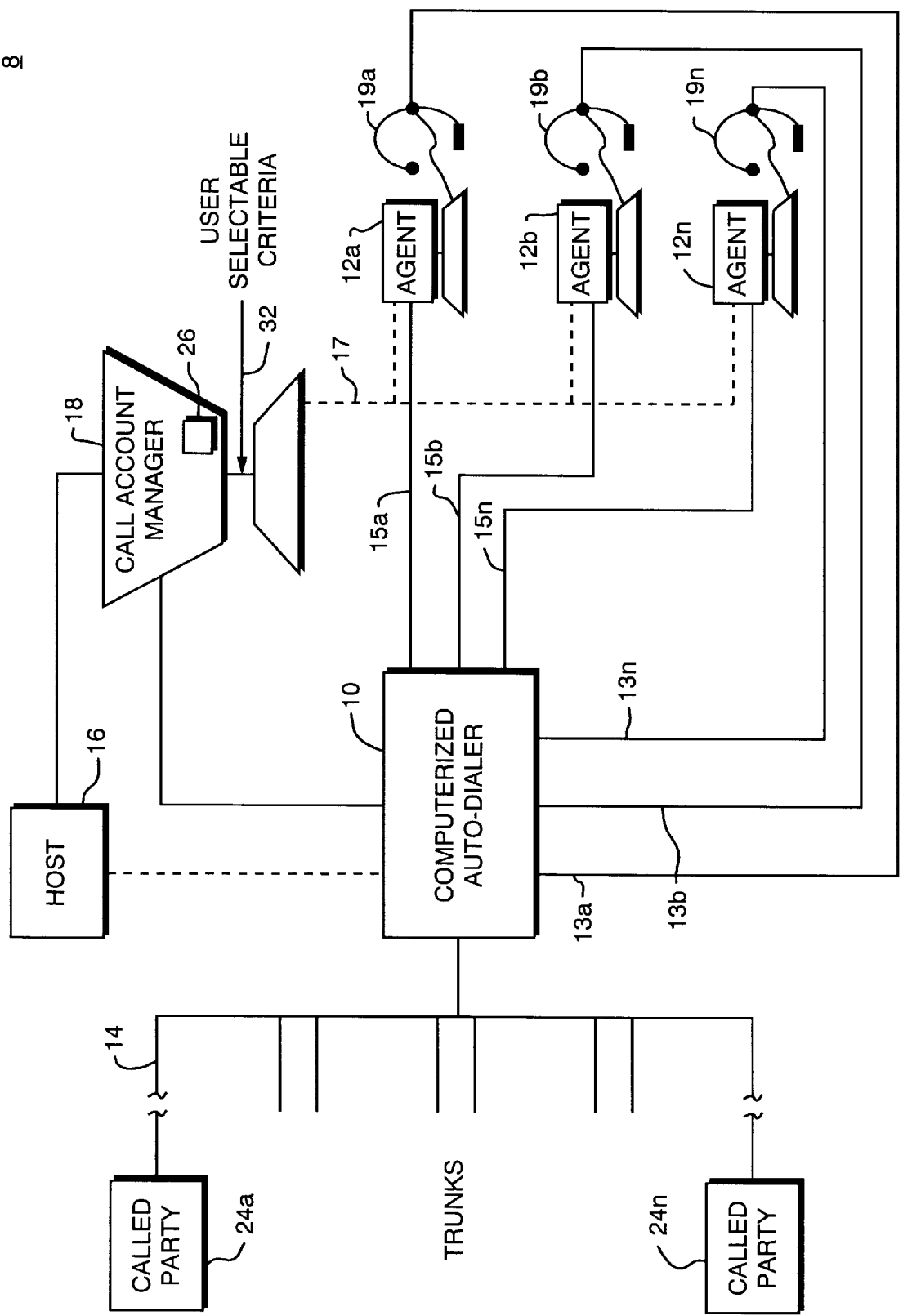
FIG. 1 is a block diagram of a telephone calling system which may be used to implement the present invention.

A telephony system 8, FIG. 1, capable of at least placing outbound calls and employing the present invention is illustrated for exemplary purposes. A host computer 16 typically maintains customer record numbers to be dialed in a database. These call records can be downloaded to a call account management workstation 18 to be filtered or possibly directly downloaded to the computerized autodialer 10.

Computerized autodialer 10 is connected to a plurality of telephone trunk lines 14 which can then be connected to called parties 24 through a telephone company central office (not shown). Computerized autodialer 10 will automatically dial telephone numbers from call records downloaded from host 16 or call account management workstation 18 and can detect if a telephone call is answered. In such cases, computerized autodialer 10 will connect a trunk line 14 connected with the called party 24a–24n to an agent workstation headset 19a–19n over a signal path 13a–13n. Called party information can also be retrieved and provided on an agent workstation 12a–12n by means of signal paths 15a–15n.

Such a telephone system 8 may not want to dial all call records within a database at a certain time. If only certain calls are to be made for a certain call campaign, such as customer accounts overdue by 60 days, for example, a preliminary user selectable filter may be used to select a list of calls to make. This filtering function may take place on the host computer 16 or the workstation 18 and will scan through the database of call records and select the call records to be dial based upon the preliminary user criteria. Such user criteria can include time of day, customer account overdue status both amount due and past due days, time zone information and other general criteria.

Once these records are sorted into one or more lists of call records to be dialed, only the call records to be dialed will be downloaded to the computerized autodialer 10. However, once the call records are downloaded, the prior art computerized dialer 10 simply dials them in the order received.

The present invention includes a call center record manager 26, which allows the call records to be scheduled and dialed in a particular predetermined order based on various criteria such as priority and time. The call center record manager may reside on the host system 16 or the call account management workstation 18. In the preferred embodiment, the call center record manager is a software program that runs on management workstation 18.

Figure 2:
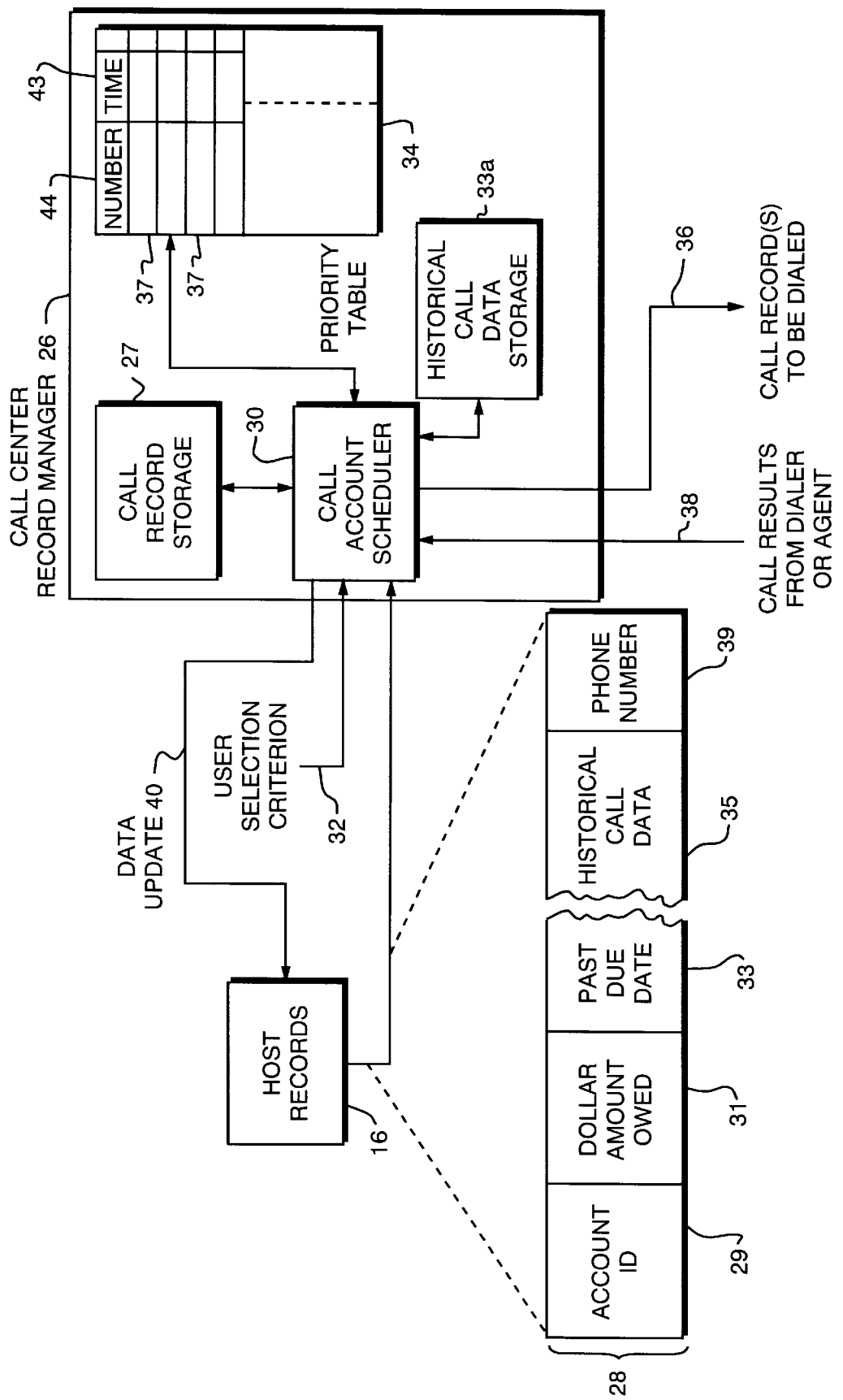
FIG. 2 is a block diagram of a call center record manager according to one feature of the present invention, which can process and prioritize call records according to the present invention.

The call center record manager 26 typically receives call account records from the host 16, FIG. 2. Each individual call record 28 typically contains data such as an account identifier 29, the amount owed on a collection account 31, the past due date 32 on such an account, one or more customer phone numbers 39, as well as other customer specific information.

Historical call data 35, which is a record of information including at least some of the calls made to this account to date may be included as part of each record 28. Alternatively, historical data 35 may be stored separately in a file or database in the call center record manager 26. In the preferred embodiment, all data on past account calling (both successful and unsuccessful) is stored separately 41 from call records stored on host 16.

Any type of call or customer data may be stored as historical data 35, including attempts made with no answer, times when connections were made but the party was not available, times when the party was talked to and any agreements that were reached about paying such a debt, or any other such data on calls made to this customer account. Any additional information which can be helpful in deciding when to schedule a call can also be stored.

The call records 28 are downloaded to the call account scheduler 30 which will decide when to schedule the calls and will, in the preferred embodiment, assign a priority value to each call. The call account scheduler 30 can use many criteria to decide when to schedule the call including the user selection criterion or criteria 32, the historical call data 35, or any other information including rule based systems or other techniques. One example is to order the calls so that the call records for accounts most overdue with the highest dollar amounts due get dialed first.

Call account scheduler 30 will process each account to be scheduled and place it in priority table 34. Priority table 34 contains slots or entries 37 for holding each account including the information provided by call account scheduler 30. Call accounts are then selected by the call account scheduler 30 from priority table 34 in accordance with its priority value, and sent to an automatic dialer 36.

As calls are processed, status information 38 from the dialer or agent handling the call will return to the call account scheduler 30 of the call center record manager 26. This status information 38 can be used to update the priority table 34, for example, removing the call record when the party has been reached and the call no longer needs to be made.

In the preferred embodiment, the priority table can also be updated during a call campaign as described below. New records may also be added or unprocessed records may also be removed. Call account scheduler 30 can reschedule the records as needed and even schedule more records or accounts based on a possible change in user selection criterion 32.

During a call campaign or upon completion of a campaign, call records 28 are uploaded over signal path 40 back to the host 16. If historical data 35 is stored with call records 28, the updated historical data is also uploaded.

The call record priority table 34, FIG. 3, contains slots or entries 37 which allow call account records 28 to be scheduled and called. In the preferred embodiment, each entry 37 includes a field 49 for an account identifier number to identify the call record entry 34, and a time range field 43 consisting of a start time 46 and a stop time 48. This time range indicates a range of times when it is appropriate to place a call. For example, if it is known that a party to be called can be reached between 8:00 a.m. and 10:00 a.m. eastern standard time, the start time field 46 will contain 8:00 a.m. and stop time field 48 will contain 10:00 a.m. Conversely, this time range can also be used to indicate a time not to make a call.

Each entry 37 also includes a priority field 50 which contains a priority scale for indicating the importance or priority of that time range. In the preferred embodiment, the priority scale is selectable from 0 to 10. If the priority is set to 0, the call is not prioritized in any way, and that call account will simply get dialed when all other accounts of higher priority have been dialed. A priority of 10 indicates a very high priority for that particular call account time range.

The call account scheduler can assign a priority based on a number of factors. The priority can be based on how important it is to contact this called party. As in a previous example, if a called party's account is seriously overdue in time or dollar value, the priority can be increased. Another basis for priority would be time zone information to allow calls in a certain time zone to be assigned a time range and a high priority so that call accounts in that time zone range are dialed at an appropriate hour for that time zone. Yet another priority level can be computed using the past calling history of the call account. If a called party is consistently reached between 5:00 and 7:00 in the evening, a high priority would be assigned to that time entry slot so that that call account will be placed during the optimum time.

A call record can have more than one entry in priority table 34. If there are several time ranges for a call record, they may all be entered into the table and the scheduler will use this multi-range of information to decide when to dial the account. Each time range can have a different priority. The number of slot entries an account has can affect the priority of that account. For example, if one account has three separate time ranges with a reasonable priority of success assigned to those slots, and a second account has only one time range overlapping one of the first call record time ranges, the second call account may receive a higher priority in its priority slot since it is more important to dial that second account during the one, single valid time range than the first account which has other available time ranges.

Further, if a time range for a call account is very narrow, for example half an hour, it may receive a high priority to make sure that call account gets scheduled during that small time range.

As a further example, record number 001, FIG. 3, line 1, has a priority of zero. It also has no time range in start field 46 or stop field 48. Record number 001, therefore, has no priority and will be dialed when the call account scheduler 30 has no other call accounts with a higher priority. Record 003, lines 2 and 3, has two entries into priority table 34. The first entry, line 2, has a time range from 8:00 a.m. to 10:00 a.m. and has priority of eight. The second entry, line 3, has a time range of from 3:00 p.m. to 6:15 p.m., and has a priority of four. The call account scheduler will attempt to schedule account 003 to be dialed during the first time range (8:00 a.m. to 10:00 a.m.) since the priority is higher for that time slot range. The higher priority for the earlier time range implies a higher likelihood of reaching the called party at that time range.

Record 007, line 4, has a time range from 6:00 p.m. to 8:00 p.m. and a priority of five. This time range overlaps the time range of the second entry for record 003, line 3. Since record 007 has a slightly higher priority than record 003 at 6:00 p.m., the call account scheduler 30 might give record 007 priority over record 003.

However, since record 003's time range will expire at 6:15 p.m., while record 007's time range continues until 8:00 p.m., the scheduler may increase the priority of the priority table slot entry line 3 to a higher priority so record 003 gets called before record 007. This example shows the flexibility priority table 34 provides. The invention is not limited to the scheduling method of this example.

If the customer represented by for record 003 gets contacted and the matter resolved, the entry at lines 2 and 3 will get removed since the call has been successful.

The present system can also dynamically update priorities as the call campaign is running. The telephone system can therefore respond to unforeseen conditions which can alter the expected telephone call campaign course. For example, if the call campaign is running slower than expected, the priority of important calls can be increased to make sure that those call records get called before the end of the call campaign. The priority may be updated using the same preliminary user selection criteria used to select the call records to dial, or a different user selection criteria 32. Also, as calls are made and completed, slots or entries will be removed from the priority table. The priority of the remaining call accounts can then be appropriately adjusted.

In the preferred embodiment, dynamically updating priorities is accomplished by dividing priorities into two values: a static priority and a dynamic priority. The static priority is assigned when the call records are initially inserted into priority table 34. The static priority is calculated based on user selection criteria 32 such as how long the account is overdue, the length and number of time ranges 46,48 for the account, etc. This static priority is the initial priority 50 used for commencing call campaign.

As the call campaign progresses, a dynamic priority may be added or substituted to the priority 50 in priority table 37. A dynamic priority may be calculated based on factors which cannot be ascertained before the call campaign commences. These factors may include selection criteria 32, including how much time remains in the time range 46, 48 for an account 44. For example, if the only time range for an account 44 will expire in 20 minutes, a high priority will be dynamically assigned to ensure the account gets dialed soon.

A low or negative dynamic priority may be used to lower the priority 50 of other accounts. The final priority 50 is a combination of the original static priority combined with the dynamic priority. The dynamic priority may simply by added to the static priority, or one may have more weight in combining the two values, depending on the algorithm.

Although priority table 34 as shown contains only four fields for each slot, other fields may be included to contain other pertinent information. Further, a different priority range may be used if it would be appropriate such as a range from 0 to 50.

Figure 4:
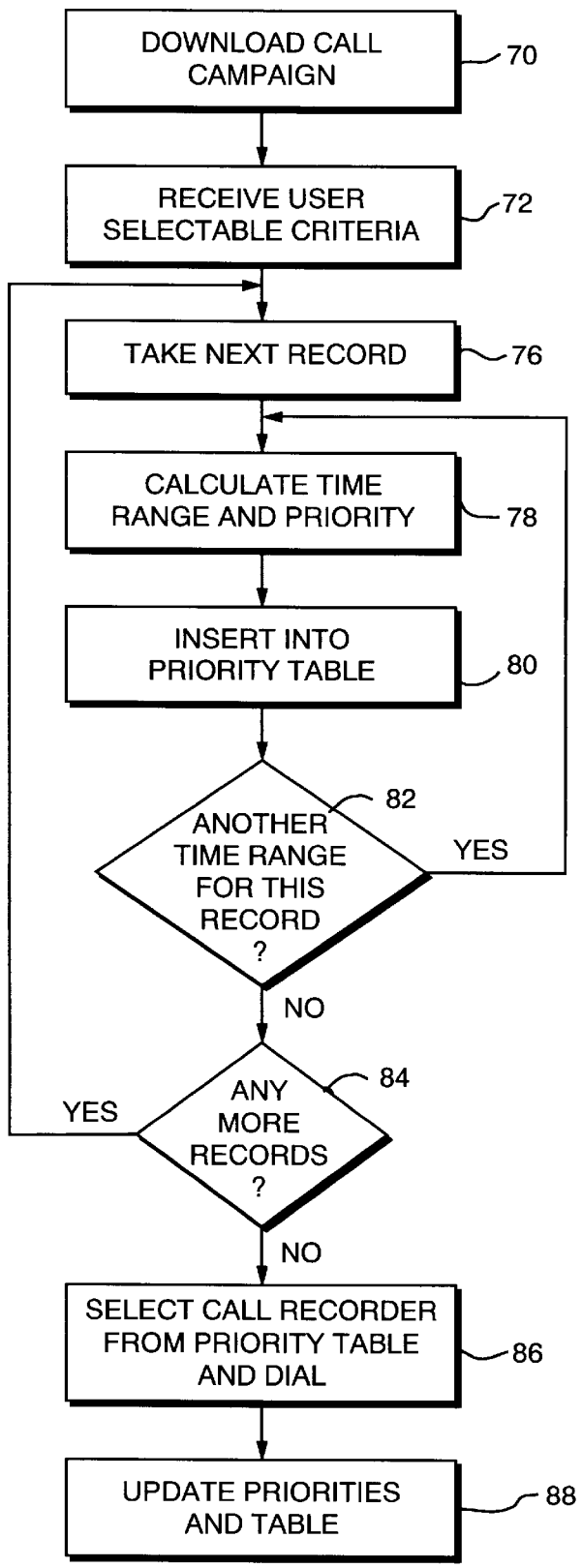
FIG. 4 is a flowchart showing the steps performed by the present invention in prioritizing and dialing a call campaign.

The steps utilized in scheduling calls in accordance with the present invention start with downloading a call campaign 70, FIG. 4. A user selectable criteria is obtained, step 72. The selectable criteria is used to prioritize call records in the downloaded call campaign.

The call records to be dialed now need to have a priority and time range assigned to them. The records are sequentially selected 76, and a time range and priority is calculated for such record. The time range and priority are now inserted into the priority table 80. If the call record has another possible time range and priority for that record, step 82, the steps will be repeated to produce another time range and priority slot or entry for the record table. An example of calculating a priority is as follows: create a static priority by starting with a value of one, and increase the static priority by one for each of the following conditions: customer account overdue by 30 days, customer account overdue by 60 days, customer account overdue by 90 days. Use this static priority to start with.

Once a given record has been completed, the next record in series 84 will be processed until there are no more records. At this time, the priority table is scanned by the call account scheduler 30 to decide what records to dial and in what order, for example based upon the present time and priority, step 86, and these calls are dialed.

As some calls complete, some calls go unanswered and time passes, the priorities may be updated, step 88. Now a dynamic priority may be added to the original (static) priority to reflect new conditions. This second user selectable priority could be similar to the static priority or based on a different criteria.

Continuing with the previous example of a possible embodiment, start with a dynamic priority of zero, and add one for each of the following conditions: only one time range available for a call record, the number of call records processed per minute falls below a predetermined threshold, less than 30 minutes remain in the call record's last time range, and less than 15 minutes remain in the call record's last time range. Therefore, as a call record's time range gets close to expiring, the dynamic priority will start to increase, enhancing the call record's likelihood of being processed in time. The dynamic priority is then added to or replaces the static priority.

With the present invention, the outbound dialer can continue to place outbound calls at a rate to keep the agents busy, yet order the calls so as to increase the likelihood of reaching the desired party at the most convenient or desired time. This increases the success of the call campaign.

Modifications and substitutions by one of ordinary skill in the art are considered to be within the scope of the present invention which is not to be limited except by the claims which follow.

What is claimed is:

1. A call account scheduling system, comprising:
   a source of call records to be processed;
   a call center call record manager, responsive to said call records to be processed, and responsive to at least one user selectable call record selection criteria, for selecting a plurality of call records to be dialed, and for generating at least one call record time range and call priority value for each call record to be dialed, and for storing said at least one call record time range and call priority value for each call record to be dialed into a call record priority table; and
   a call account scheduler, responsive to said call record priority table and to call record call results received from a call dialer, for scanning said call record priority table, for determining which call record should be processed next, and for providing said call record to be processed next to a call dialer, wherein said call account scheduler dynamically recalculates at least said call record call priority value stored in said call record priority table based on said call record call results received from said call dialer while said call center manager is providing call records to said call dialer, to determine which call record should be processed next.

2. The call account scheduling system of claim 1, wherein said call center record call manager dynamically adjusts said call record time range and call priority value based on said user selectable call record selection criteria.

3. The call account scheduling system of claim 1, wherein each of said call records to be processed include a unique call record identifier.

4. The call account scheduling system of claim 1, wherein said call account scheduling system includes historical data on call activity.

5. The call account scheduling system of claim 4, wherein each of said call records to be processed contain said historical data on call activity.

6. The call account scheduling system of claim 4, wherein said call center call record manager contains said historical data on call activity.

7. The call account scheduling system of claim 4, wherein said historical data on call activity includes at least one time indication representing at least one previous contact time with a called party associated with a given call record.

8. The call account scheduling system of claim 4, wherein said historical data on call activity is subsequently updated with results of said call record being dialed by said call dialer.

9. The call account scheduling system of claim 1, wherein said user selectable call record selection criteria includes time zone information.

10. The call account scheduling system of claim 1, wherein said user selectable call record selection criteria includes call accounts whose collection due date is past due by a predetermined time period.

11. The call account scheduling system of claim 1, wherein said user selectable call record selection criteria includes call accounts wherein a collection dollar amount due exceeds a predetermined dollar amount value.

12. The call account scheduling system of claim 1, wherein said user selectable call record selection criteria includes toll call charge rate.

13. The call account scheduling system of claim 1, wherein said user selectable call record selection criteria includes at least one telephone number area code.

14. A method of ordering and dialing a plurality of call records for a call record dialing system, said method comprising the steps of:
   providing a source of call records to be processed;
   providing a call center call record manager;

receiving at least one user selectable call record selection criteria;

generating at least one call record time range and call priority value for each of said plurality of call records from said source of call records desired to be actually processed in response to said received at least one user selectable call record selection criteria;

storing said at least one call record time range and call priority value in a call record priority table;

scanning said call record priority table to determine which call record should be processed next including selecting at least one call record to be dialed next based on said time range and priority entry from said call record priority table, wherein said step of scanning dynamically recalculates at least one said call record call priority value stored in said call record priority table based on call record call results received from a call dialer while call records are provided to said call dialer, to determine which call record should be processed next; and dialing said at least one selected call record to be dialed next.

15. The method of claim 14, including the step of:

filtering said plurality of call records from said source of call records to be potentially processed to exclude at least one call record based on said user selectable call record selection criteria.

16. The method of claim 14, wherein each of said call records to be potentially processed contain historical data on call account activity.

17. The method of claim 16, further including the step of:

after dialing said plurality of call records, updating said historical data on call record activity contained in said call records.

18. The method of claim 14 wherein each of said call records to be potentially processed contain a unique record identifier.

19. The method of claim 14 including the step of:

during dialing of said at least one selected call record to be dialed next, dynamically recalculating at least one said call record call priority value stored in said call record priority table based on call record call results received from a call dialer while call records are provided to said call dialer, to determine which call record should be processed next based on a second user selectable call record selection criteria.

20. The method of claim 19, wherein said user selectable call record selection criteria includes the passage of real time.

21. The method of claim 19, wherein said user selectable call record selection criteria includes the ratio of said plurality of call records being connected.

* * * * *